Sept. 13, 1932.   W. P. ERBES   1,877,567
HOT AND COLD WATER MIXER FOR SHOWERS
Filed Sept. 2, 1931
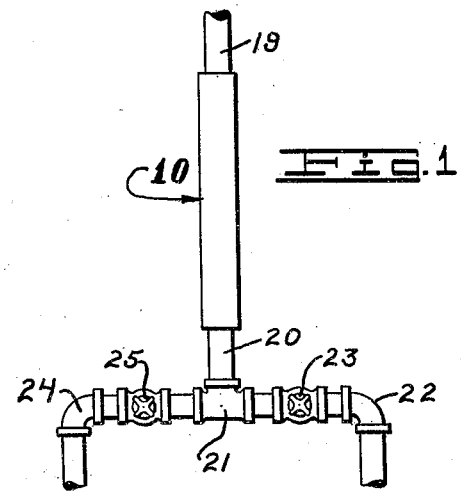
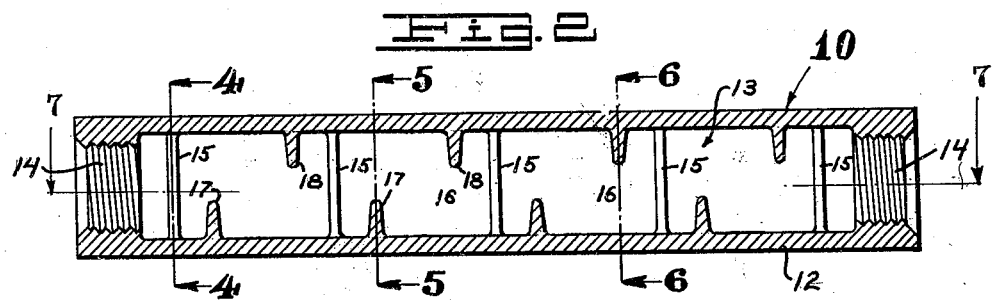
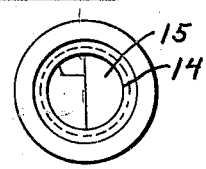 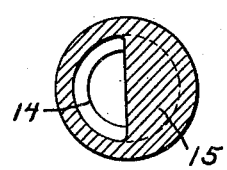 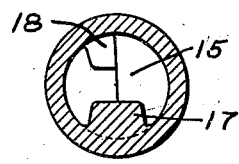 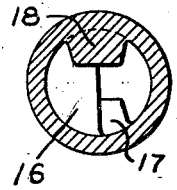
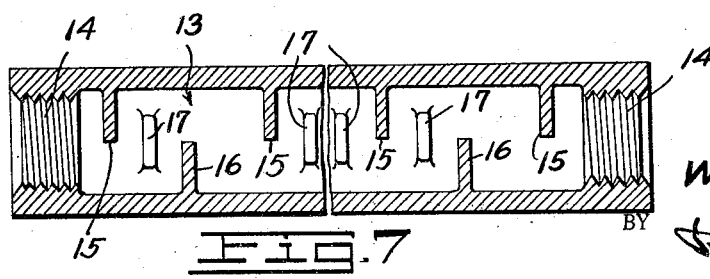
INVENTOR.
W. P. ERBES
BY
ATTORNEY.

Patented Sept. 13, 1932

1,877,567

UNITED STATES PATENT OFFICE

WILLIAM P. ERBES, OF LOS ANGELES, CALIFORNIA

HOT AND COLD WATER MIXER FOR SHOWERS

Application filed September 2, 1931. Serial No. 560,727.

This invention relates to improvements in hot and cold water mixers.

The general object of the invention is to provide an improved device for mixing hot and cold water for showers or similar purposes.

Another object of the invention is to provide a device of the class described including means whereby as the water passes therethrough it is caused to flow in a sinuous motion and also in a turbulent motion.

A further object is to provide a device as described which is simple in construction and does not need attention after once installed.

Other objects and the advantages of this invention will be apparent from the following description, taken in connection with the accompanying drawing wherein:

Fig. 1 is a fragmentary elevation of a shower installation showing my improved water mixer operatively installed therein.

Fig. 2 is a central longitudinal section through my improved water mixer.

Fig. 3 is an end view of the water mixer.

Fig. 4 is a section taken on line 4—4 of Fig. 2.

Fig. 5 is a section taken on line 5—5 of Fig. 2.

Fig. 6 is a section taken on line 6—6 of Fig. 2, and

Fig. 7 is a longitudinal section on line 7—7 Fig. 2.

Referring to the drawing by reference characters I have indicated my improved hot and cold water mixer generally at 10. As shown the device 10 comprises a body portion 12 which is preferably made of a cast metal and includes a chamber portion 13 having at each end a reduced threaded aperture 14.

Within the chamber 13 and integral with the body 12 I provide a plurality of spaced partitions or baffles 15 and 16. The partitions 15 and 16 alternate and each extends approximately halfway across the chamber 13, the partition 15 being on one side of the device with the partition 16 on the opposite side.

Positioned intermediate the partitions 15 and 16 I provide baffle members 17 and 18 which are integral with the body 12. The baffle members 17 and 18 are arranged to extend inwardly at approximately right angles to the partitions 15 and 16 and they do not extend completely across the chamber 13 as do the partitions. The baffle members 17 are positioned on one side of the center of the chamber while the baffle members 18 are positioned on the opposite side and both the baffles 17 and 18 terminate short of the center of the chamber, being of less length than the diameter of said chamber.

As shown in Fig. 1 the water mixer 10 is adapted to communicate with a shower or other device through a suitable conduit 19 which engages the threads 14 at one end of the body 12. Engaging the threads 14 at the opposite end of the body I provide a conduit 20 which communicates with a T-fitting 21. Communicating with the T-fitting 21 on one side I provide a conduit 22 which is adapted to communicate with a suitable source of cold water supply and which has a shut-off valve 23 interposed therein. Communicating with the fitting 21 on the opposite side I provide a conduit 24 which is adapted to communicate with a suitable source of hot water supply and which has a shut off valve 25 interposed therein.

When the hot and cold water shut-off valves are opened the water from each source flows into the fitting 21 and thence through the conduit 20 into the chamber 13 of the water mixer 10. As the water passes through the chamber 13 the partitions or baffles 15 and 16 cause the water to flow in a weaving or sinuous motion and the baffles 17 and 18 cause the water to flow in a turbulent motion thereby completely mixing the hot and cold water in a short length of flow.

From the foregoing description it will be apparent that I have provided a hot and cold water mixer which is simple in construction and highly efficient in use.

Having thus described my invention, I claim:

1. In a water mixing device, a hollow body, means to connect said body to a source of fluid supply, a plurality of spaced baffles in said body to cause fluid as it flows through said hollow body to flow in a weaving motion and other baffles interposed between said first baffles to cause turbulence of said weaving motion flow.

2. In a water mixing device, a hollow body, means to connect said body to a source of fluid supply, means in said body to cause fluid as it flows therethrough to flow with a sinuous motion and means to cause turbulence of said sinuous motion flow.

3. In a water mixing device, a hollow body, a plurality of baffle members in said body, said baffle members being of a length to obstruct less than one half of the passageway through said hollow body and being alternately arranged on opposite sides of said hollow body.

4. In a water mixing valve, a hollow body, a plurality of spaced baffles in said hollow body, said baffles extending inwardly half way across said hollow body and being positioned on opposite sides of said body and other baffle members positioned intermediate said first baffles and extending inwardly at approximately right angles thereto.

5. In a water mixing device, a hollow body, a plurality of partitions in said body, said partitions extending inwardly and being adapted to obstruct approximately one half of the passageway through said body and said partitions being alternately positioned on opposite sides of said hollow body, a plurality of baffle members in said body extending inwardly at approximately right angles to said partitions, said baffle members being adapted to obstruct less of the passageway through said hollow body than said partitions and being alternately arranged on opposite sides of said hollow body.

6. In a water mixing device, a body having a chamber therein and a reduced threaded aperture in each end of said body communicating with said chamber, a plurality of spaced partitions in said chamber, said partitions extending inwardly approximately half way across said chamber and said partitions being alternately positioned on opposite sides of said chamber, baffle members positioned intermediate said partitions and extending inwardly at approximately right angles to said partitions, said baffle members terminating short of the center of said chamber and being alternately positioned on opposite sides of said chamber.

7. In a water mixing device, a hollow body, a plurality of spaced partitions in said hollow body, said partitions extending inwardly approximately one half way across said hollow body and said partitions being alternately positioned on opposite sides of said hollow body, baffle members positioned intermediate said partitions and extending at approximately right angles thereto, said baffle members terminating short of the center of said hollow body and being alternately positioned on opposite sides of said hollow body, said baffle members covering less than one half of the area of said chamber.

In testimony whereof, I hereunto affix my signature.

WILLIAM P. ERBES.